United States Patent [19]

Schröder et al.

[11] 3,897,696

[45] Aug. 5, 1975

[54] GEAR TRANSMISSION

[75] Inventors: Walter Schröder, Bochum-Stiepel; Uwe Niemann, Essen, both of Germany

[73] Assignee: WGW Westdeutsche Getriebe- und Kupplungswerke GmbH, Herne, Germany

[22] Filed: Mar. 16, 1973

[21] Appl. No.: 342,067

[30] Foreign Application Priority Data
Mar. 16, 1972 Germany .......................... 2212757

[52] U.S. Cl. .......... 74/665 B; 74/665 GA; 74/665 P; 74/608; 74/606
[51] Int. Cl. ...................... F16h 37/06; F16h 57/02
[58] Field of Search .. 74/606 R, 608, 665 F, 665 G, 74/665 GA, 665 B, 665 A, 665 P

[56] References Cited
UNITED STATES PATENTS

| | | | |
|---|---|---|---|
| 1,660,489 | 2/1928 | Hirvonen | 74/665 B X |
| 2,995,046 | 8/1961 | Mansachs | 74/665 GA |
| 3,352,174 | 11/1967 | West | 74/608 |
| 3,369,421 | 2/1968 | Short et al. | 74/606 X |
| 3,398,595 | 8/1968 | Clutter | 74/665 GA |

FOREIGN PATENTS OR APPLICATIONS
1,216,558 12/1970 United Kingdom .............. 74/665 A

*Primary Examiner*—Samuel Scott
*Assistant Examiner*—P. S. Lall
*Attorney, Agent, or Firm*—Herbert L. Lerner

[57] ABSTRACT

In a transmission including two intermediate shafts driven by at least one drive shaft through at least one respective transmission stage and carrying at least one pinion, respectively, meshing with a gear located between the two intermediate drive shafts and connectible to a machine driven by the transmission, there are included a plurality of frames wherein the transmission stages are disposed, each of the frames being mounted on the one hand on one of the intermediate shafts, and being articulatingly connected, on the other hand, to the frame mounted on the other intermediate shaft.

8 Claims, 4 Drawing Figures

GEAR TRANSMISSION

The invention relates to a gear transmission having two intermediate shafts driven by at least one drive shaft through at least one respective serially connected transmission stage and carrying at least one pinion, respectively, meshing with a gear located between the two intermediate drive shafts and connected to the driven machine.

Such drives are known in various embodiments. In many cases, the intermediate shafts are driven independently of one another by motors associated with each intermediate shaft. Such drives are not only costly with respect to the construction thereof, but also tend to have unreliable operating characteristics because the load capacity of the intermediate shafts that are driven independently of one another are controllable only with great difficulty.

Drives wherein only one motor operates, through a common drive shaft, upon the intermediate shafts entail difficulties with respect to the construction thereof. To this end, serially connected transmission stages or transfer case stages must be provided for both intermediate shafts. When all of the transmission stages from the driving to the driven members are disposed in a common housing, adequate load and running characteristics of the gear wheels and pinions is attainable only with great difficulty. In addition thereto, maintenance and repair of such enclosed constructions are subjected to considerable difficulties and are very time-consuming.

An object of the invention of the instant application is accordingly to provide a transmission of the foregoing type having favorable operating characteristics especially when installed in heavy processing machinery, such as converters, rotary trommels or plate conveyors, or the like, that is readily maintainable and can be relatively rapidly reparable in the event of damage thereto.

Another object of the invention is to provide such a transmission that is readily adjustable, within specific limits, with respect to the mutual axial spacing of the intermediate shafts.

Further in accordance with an object of the invention, the transmission of the invention should be so constructed as to maintain open and accessible the central region of the gear that is connected to the driven machine, if the gear is secured directly to the casing or bearing neck of the rotary trommel.

With the foregoing and other objects in view, there is provided in accordance with invention in a transmission including two intermediate shafts driven by at least one drive shaft through at least one respective transmission stage and carrying at least one pinion, respectively, meshing with a gear located between the two intermediate drive shafts and connectible to a machine driven by the transmission, there are included a plurality of frames wherein the transmission stages are disposed, each of the frames being mounted, on the one hand, on one of the intermediate shafts, and being articulatingly connected, on the other hand, to the frame mounted on the other intermediate shaft.

In accordance with another feature of the invention, a respective pair of the frames that are connected to one another form an angle enclosed therebetween which deviates from 180°.

With this construction, each transmission part is rotatably connected to the adjacent parts. Due to the angle which is enclosed between the frames of the transmission stages and which, in a preferred embodiment, deviates from 180°, variations in the spacing or clearance between the intermediate shafts are readily compensated, so that movements which occur during operation of the transmission, for example as a result of temperature influences, are compensated through the mutual rotational mobility of the transmission parts. Special equipment for absorbing reaction torques at the frames of the transmission stages can be dispensed with, because they mutually support one another through the articulating connection thereof. Moreover, relatively easy assembly results therefrom so that repairs can be effected without any great time loss.

The transmission of the invention is of particular advantage for use with heavy machines which are to be driven by a single motor. Consequently, in accordance with a further feature of the invention, the transmission includes one common drive shaft, two pinions having teeth with opposing inclinations mounted on the common drive shaft, a gear wheel mounted on each of the intermediate shafts, and a gear wheel in each of the transmission stages associated with one of the intermediate shafts, respectively, each of the pinions being in meshing engagement with a gear wheel of one of the intermediate shafts or with a gear wheel of a transmission stage associated with the respective intermediate shaft. The drive shaft coupled to the motor adjusts itself automatically due to its axial displaceability so that uniform power branching occurs.

The drive shaft is advantageously mounted in the frames of the transmission stages of both intermediate shafts. In accordance with an added feature of the invention, the frames have a mutual swivel joint connection therebetween, and the drive shaft has an axis substantially coincident with the axis of the swivel joint connection. These features provide not only a simplified construction but also monitorable and controllable characteristics with respect to power branching and power transmission. The unavoidable changes in the axial spacing of the intermediate shafts which occur during operation when power is transmitted, are always compensated by the free displaceability of the transmission parts.

The axial forces occurring due to the inclined meshing or helical gearing of pinion and gear wheel of the last transmission stage or the intermediate shaft are diverted, in accordance with the invention, directly to the bearing carrier of the intermediate shafts, the frames of the transmission stages being pivotable with respect to the bearing carrier but being held against displacement in direction of the axes of the intermediate shafts.

To expand the displaceability between the parts of the transmission which is sought after according to the invention, there is provided a common pinion carrier supported so as to be movable in the manner of a ball-and-socket joint with respect to the base of the driven machine, the intermediate shafts being mounted in the common pinion carrier. It is thereby possible to relieve the bearings of the gear connected to the driven machine of the weight of the transmission which drives the gear. Simultaneously due to the ball-and-socket joint support, the soughtafter free adjustability between both pinions of the intermediate shafts and the gear is ensured.

In accordance with yet another feature of the invention, the pinion carrier is supported on the driven machine base by at least two connecting rods extending in parallel to tangents to partial circle contact points between pinions mounted on the intermediate shafts, on the one hand, and the gear connected to the driven machine, on the other hand. This provides optimal load and running characteristics in the range of the entire transmission.

In summary the advantages derived from the invention are that, due to the marked displaceability and the resultant free adjustability of all of the transmission parts, such as the frame or pinion carrier located between the motor and the gear connected with the driven machine, optimal load and running characteristics of the mutually meshing pinions and gear wheels are assured. This results in great operational reliability and durability. Associated therewith, is an above-average, single construction that provides easy maintenance and repair opportunities as well as great adaptability with respect to the onset or introduction of the drive for certain measurement deviations and internal movements during the operation of the machine. Furthermore, due to the disposition of the serially-connected transmission stages in the frames that are preferably located in angular relationship to one another, the possibility is afforded of keeping the central region of the gear, that is connected to the driven machine, open and accessible.

This is important, for example when the gear is mounted on the neck of a tube mill and the material supply or discharge of the mill is effected through the hollow mill neck. If only one motor is installed as the drive, uniform power branching is attained for both transmission branches.

Other features which are considered as characteristic for the invention are set forth in the appended claims.

Although the invention is illustrated and described herein as embodied gear transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
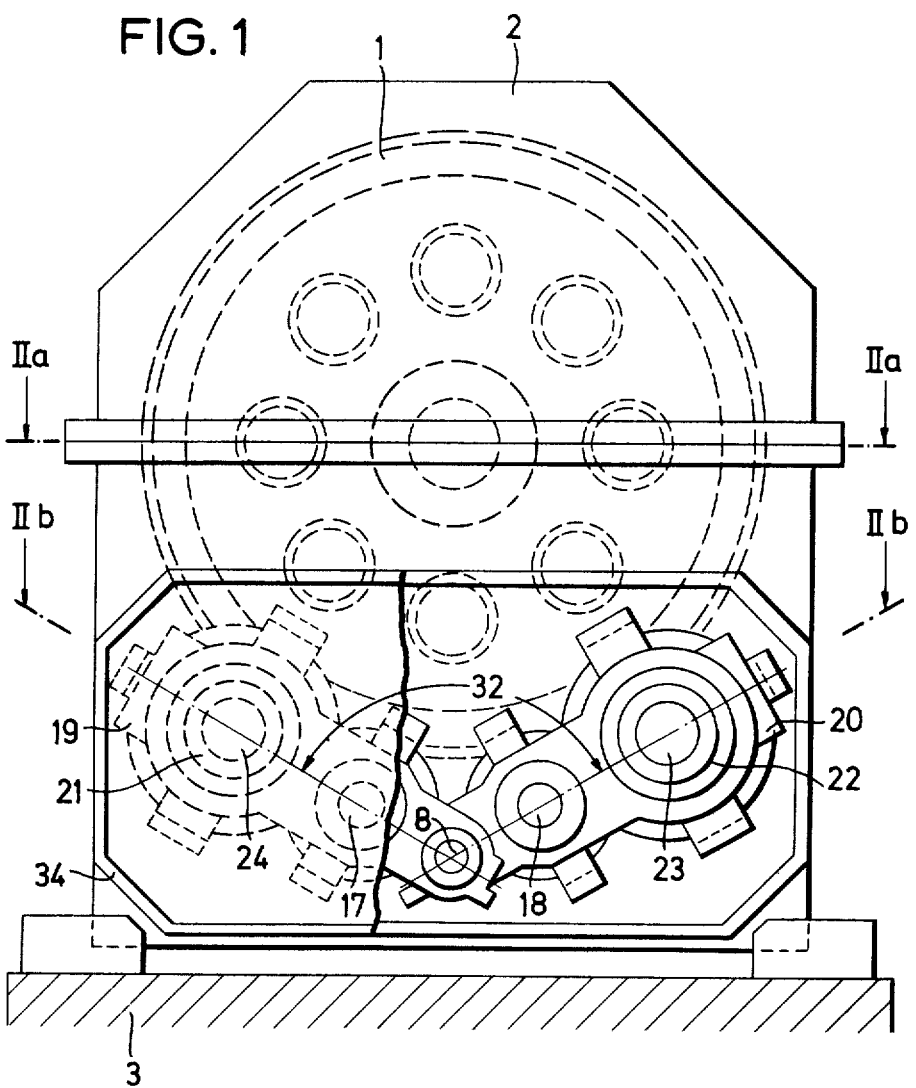
FIG. 1 is a diagrammatic view of a stationary gear transmission constructed in accordance with the invention.
Figure 2:
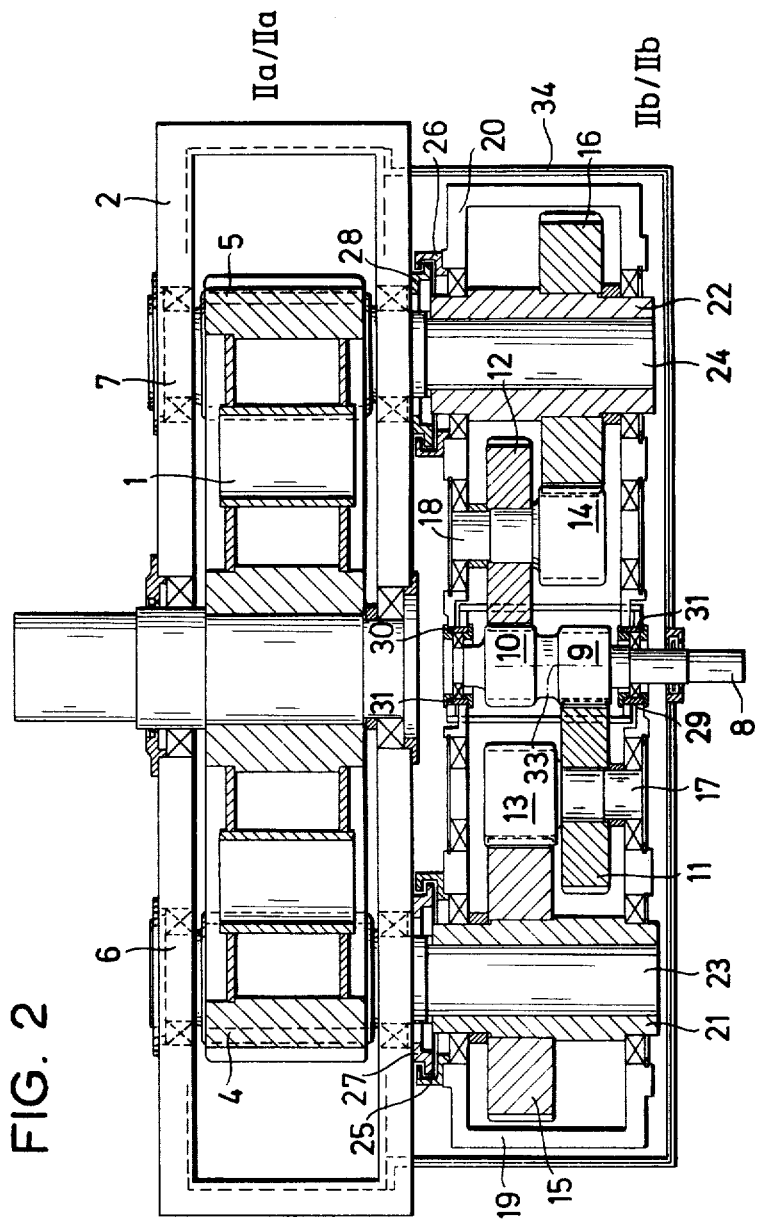
FIG. 2 is a cross-sectional view of FIG. 1 taken along the lines IIa—IIa and IIb—IIb, in the direction of the arrows.

Referring now to the drawing, and first particularly to the embodiment of the invention shown in FIGS. 1 and 2, there is provided therein a gear 1 connected to a driven machine and supported by a bearing plate on carrier 2. The bearing plate 2 is secured to the machine base 3. The gear 1 is in meshing engagement with pinions 4 and 5 which are seated on intermediate shafts 6 and 7 that are also located in the bearing plate or carrier 2.

The intermediate shafts 6 and 7 are driven by a common drive shaft 8 through serially connected transmission states that are located on the front face of the bearing plate or carrier 2. The drive shaft is connected to a drive motor not shown in the figures of the drawing. Pinions 9 and 10, which have mutually opposed tooth inclinations, are affixed to the drive shaft 8. The pinions 9 and 10 mesh with gear wheels 11 and 12 of the serially connected transmission stages, so that the driving power of the motor becomes branched and, subsequently, is transmitted over the pinions 13 and 14 and the gear wheels 15 and 16 to the intermediate shafts 6 and 7.

The gear wheels 11 and 12 and the pinions 13 and 14 are respectively secured, in common, on serially connected transmission shafts 17 and 18.

In the above described embodiment of the invention, the serially connected transmission stages are of two-stage construction. However, multi-stage serially connected transmissions or even single-stage transmissions may also be used. In the latter instance, the pinions of the drive shaft mesh directly with the gear wheels of the intermediate shaft.

Each of the severally connected transmission stages is accommodated in a respective frame 19,20. The frames 19 and 20 are mounted, respectively, on the intermediate shafts 6 and 7. In the embodiment of the invention, each frame 19,20 is first disposed on a hollow shaft 21,22, respectively, on which the wheels 15,16, respectively, of the intermediate shaft 6,7, respectively, is also affixed. Assembly of the transmission states is then effected by sticking the hollow shafts 21 and 22 upon pivots or pins 23 and 24, respectively, formed on the intermediate shafts 6 and 7 and projecting from the bearing plate or carrier 2. In another embodiment of the invention not further described herein, it is also possible, however, both to mount the frame of the transmission stages pivotally on the pins of the intermediate shafts, as well as to fasten the gear wheels 15 and 16 thereto. In the interest of facilitating assembly of the gear transmission, the frames are of multipartite construction in this case.

In order to be able to absorb axial forces which may occur, the frames 19 and 20 are provided, on the side thereof facing the bearing plate or carrier 2, with beveled holder rings 25 and 26, for example, which engage form-lockingly in correspondingly profiled counterparts 27 and 28 on the bearing plate or carrier 2. According to the invention, the frames 19 and 20 are connected articulatingly with one another. To this end, the frames 19 and 20 are formed with ball-and-socket joint bores 29 and 30 respectively, through which there is slid a bearing sleeve 31 which connects the frames 19 and 20. The swivel-joint connection 29,30,31 resulting therefrom, permits a scissors-like movement of both frames 19 and 20. In assembled condition the frames 19 and 20 enclose between then an angle 32 preferably deviating from 180°. The frames brace 19 and 20 support or brace one another through the ball-and-socket connection. An additional torque support is obviated.

The drive shaft 8 is advantageously also mounted in the frames 19 and 20. The axis of the drive shaft 8 is made to extend coaxially to the axis of the swivel joint connection 29,30, 31. Expediently, the drive shaft 8 is disposed directly in the bearing sleeve 31 of the swivel joint connection, so that the axis of the drive shaft 8 and the axis of the swivel joint connection 29,30,31 coincide with one another. The coincident axes are identified in FIG. 2 by the reference numeral 33. The drive shaft 8 is mounted in the bearing sleeve 31 so as to be displaceable in axial direction. It is thereby possible for the pinions 9 and 10 of the drive shaft 8, which have mutually opposing tooth inclinations, to adjust so that a uniform power branching of the torques introduced by the drive shaft 8 will occur and, simultaneously, an optimum load character or ratio for the mutually meshing pinions and gear wheels will be established.

A protective hood 34 is disposed around the serially connected transmission stages or around the frames 19 and 20 thereof, and is secured to the bearing plate carrier 2. In FIG. 1, the protective hood 34 is illustrated partly in section, particularly in order to show the bearing system of frames 9 and 10 of the serially connected transmission stages on the intermediate shafts 6 and 7, respectively, as well as the ball-and-socket connection. By the construction achieved with the invention of locating the serially connected transmission stages below the gear 1, the entire central region of the gear 1, which is connected to the machine, remains open and accessible. Particularly, in those cases wherein the gear transmission of the invention is utilized for the drive of tube mills and rotary trommels, and wherein the gear 1 is seated directly on the neck of the trommel, the trommel can be loaded directly through the hollow neck of the trommel (see FIGS. 3 and 4) without any interference by the drive.

In the preferred embodiment of the invention, the intermediate shafts 6 and 7 are driven through a common drive shaft 8 by a single motor. However, the drive shaft 8 may be replaced by any other transmission members which permit uniform power branching, for example by means of a differential transmission. It is also possible, within the scope of the invention, to employ a separate motor, respectively, for driving each of the intermediate shafts 6 and 7.

Figure 3:
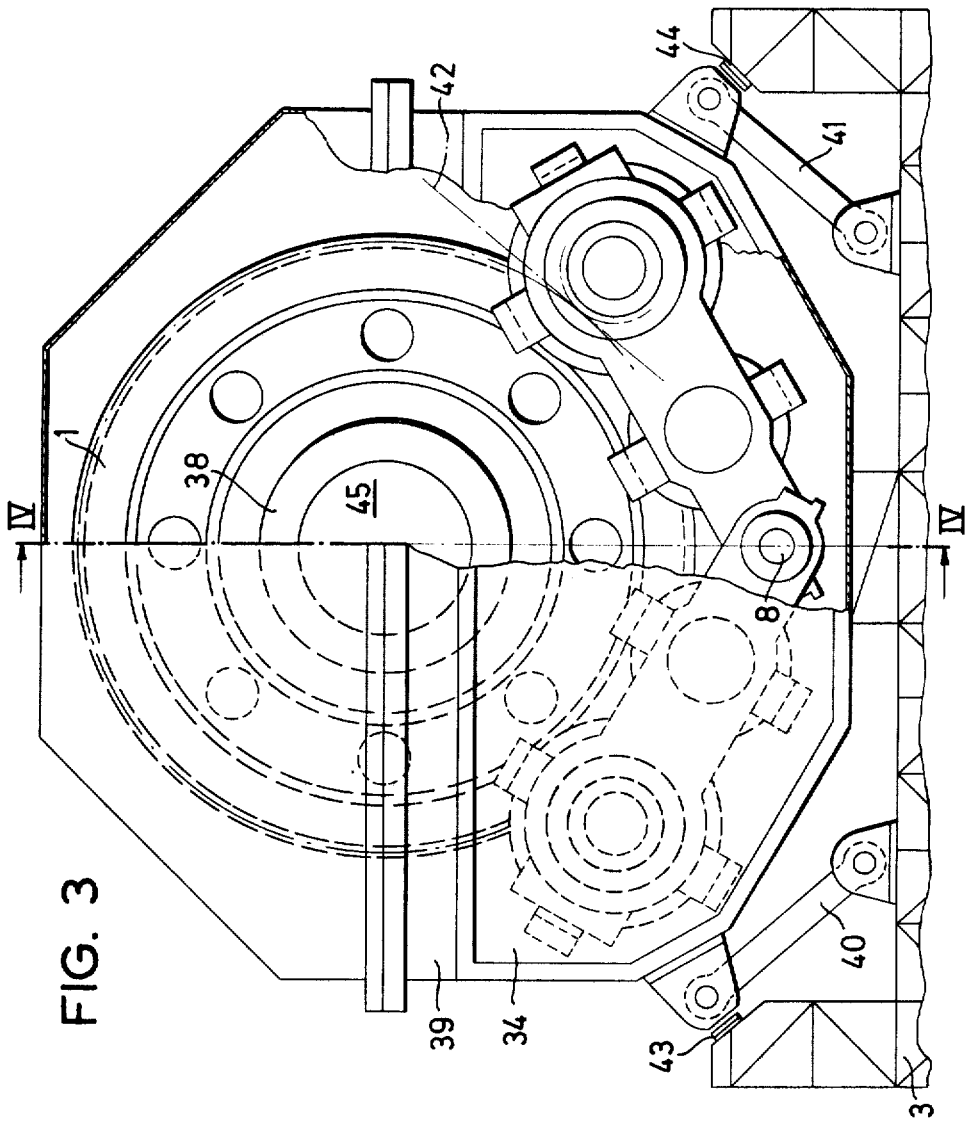
FIG. 3 is a view similar to that of FIG. 1 of another embodiment of the gear transmission of the invention having a support with a ball-and-socket type movement on the machine base.
Figure 4:
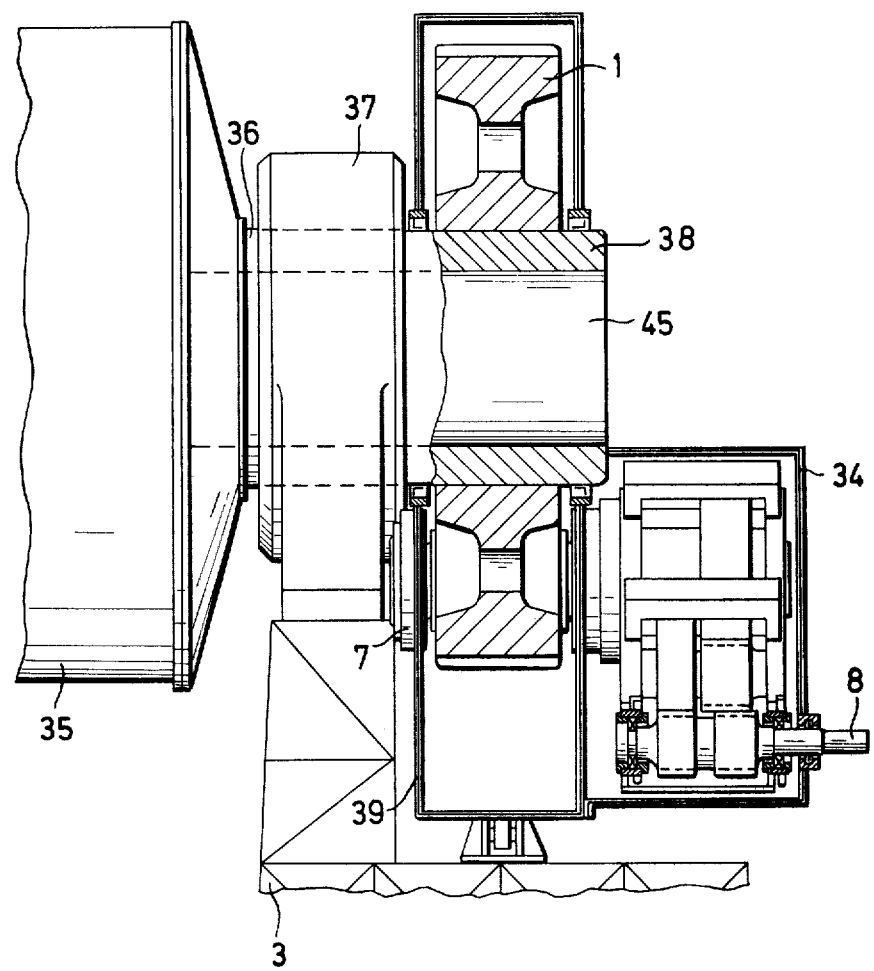
FIG. 4 is a cross-sectional view of FIG. 3 taken along the section line IV—IV in the direction of the arrows.

Another embodiment of the transmission of the invention is illustrated in FIGS. 3 and 4. In this embodiment, a hollow drive shaft 36, which is connected to the driven machine 35, is supported through a journal bearing 37 directly on the machine base 3. The gear 1 is secured on a pin or pivot 38 of the hollow driving shaft 36. Through the hollow space 45 of the drive shaft 36, the central region of the gear 1, the driven machine 35 is able to be loaded.

The intermediate shafts 6 and 7 are accommodated in a separate pinion carrier 39 which does not stress or load the journal bearing 37. The pinion carrier 39 is supported separately through connecting rods 40 and 41 in universally movable relation on the machine bade 3. The connecting rods 40 and 41 are disposed so that they extend parallel to the tangents 42 at the partial circle contact points between the pinions 4 and 5 and the gear 1. In the interest of clarity in FIG. 3 the tangent 42 is drawn only on the sectioned side of the protective hood 34, in the contact point of the partial circles. The universally displaceable bearing of the pinion carrier 39 affords ready displacement of the pinions 4 and 5 with respect to the gear 1 and causes the pinions 4 and 5 to adjust automatically to a uniform loading and an optimum load diagram. In order to maintain the necessary backlash between the pinions 4 and 5, on the one hand, and the gear 1, on the other hand, the mobility of the pinion carrier 39 is limited by stops 43 and 44 which are mounted on the machine base 3. The stops 43 and 44 are constructed so that the play of the pinion carrier 39 is fixed not only in lateral direction, but also in axial direction of the intermediate shafts.

The embodiment shown in FIGS. 3 and 4 of the gear transmission of the invention affords, in the same manner as does the embodiment of FIGS. 1 and 2, a reciprocal rotary mobility of the individual parts of the transmission. In the last-described embodiment, there is further provided a free adjustability of the intermediate shafts 6 and 7, which are mounted in the pinion carrier 39, with respect to the gear 1 that is connected to the driven machine. The desired optimal load diagrams at the mutually coordinated teeth flanks are produced thereby. In addition, the weight of the transmission is directly absorbed by the machine base 3 and does not additionally load the journal bearing 37 of the drive shaft 36.

We claim:

1. In a transmission including two gear trains having intermediate shafts driven by a single drive shaft through at least one respective transmission stage and carrying at least one pinion, respectively, meshing with a gear located between the two intermediate drive shafts each gear train being connectible to a machine driven by the transmission, means to make the meshing of the gear trains to the driven machine self adjustable, comprising a pair of frames wherein the transmission stages are disposed, each of said frames being mounted on one of the intermediate shafts, and each being articulatingly connected on the other hand to the frame mounted on the other intermediate shaft, each of the frames being pivotally mounted and articulatingly connected about the drive shaft.

2. Transmission according to claim 1, wherein a respective pair of said frames that are connected to one another form an angle enclosed therebetween which deviates from 180°.

3. Transmission according to claim 1 including one common drive shaft, two pinions having teeth with opposing inclinations mounted on the common drive shaft, a gear wheel mounted on each of said intermediate shafts, and a gear wheel in each of said transmission stages associated with one of said intermediate shafts, respectively, each of said pinions being in meshing engagement with a gear on one of said intermediate shafts.

4. Transmission according to claim 3, wherein said drive shaft is mounted in said frames of said transmission stages of both said intermediate shafts.

5. Transmission according to claim 1, wherein said intermediate shafts are mounted in a bearing carrier, said frames of said transmission stages being pivotable with respect to said bearing carrier but being held against displacement in direction of the axes of said intermediate shafts.

6. In a transmission including two intermediate shafts driven by at least one drive shaft through at least one respective tranmission stage and carrying at least one pinion, respectively. meshing with a gear located between the two intermediate drive shafts and connectible to a machine driven by the transmission, the improvement which comprises a plurality of frames wherein the transmission stages are disposed, each of said frames being mounted on the one hand on one of the intermediate shafts, and being articulatingly connected on the other hand to the frame mounted on the other intermediate shaft, including one common drive shaft, two pinions having teeth with opposing inclinations mounted on the common drive shaft, a gear wheel mounted on each of said intermediate shafts, and a gear wheel in each of said transmission stages associated with one of said intermediate shafts, respectively, each of said pinions being in meshing engagement with a gear on one of said intermediate shafts, said drive shaft being mounted in said frames of said transmission stages of both said intermediate shafts, said frames having a mutual swivel joint connection therebetween, and wherein said drive shaft has an axis substantially coincident with the axis of said swivel joint connection.

7. In a transmission including two intermediate shafts driven by at least one drive shaft through at least one respective transmission stage and carrying at least one pinion, respectively, meshing with a gear located between the two intermediate drive shafts and connectible to a machine driven by the transmission, the improvement which comprises a plurality of frames wherein the transmission stages are disposed, each of said frames being mounted on the one hand on one of the intermediate shafts, and being articulatingly connected on the other hand to the frame mounted on the other intermediate shaft, a common pinion carrier supported so as to be movable in the manner of a ball-and-socket joint with respect to the base of the driven machine, said intermediate shafts being mounted in said common pinion carrier.

8. Transmission according to claim 7, wherein said pinion carrier is supported on the driven machine base by at least two connecting rods extending in parallel to tangents to partial circle contact points between pinions mounted on said intermediate shafts, on the one hand, and the gear connected to the driven machine, on the other hand.

* * * * *